United States Patent
Longé et al.

(10) Patent No.: US 8,294,667 B2
(45) Date of Patent: Oct. 23, 2012

(54) DIRECTIONAL INPUT SYSTEM WITH AUTOMATIC CORRECTION

(75) Inventors: Michael R. Longé, Seattle, WA (US); Brian Palmer, Seattle, WA (US); Keith Charles Hullfish, Snohomish, WA (US); Doug Brams, Seattle, WA (US)

(73) Assignee: Tegic Communications, Inc., Seattle, WA (US)

( * ) Notice: Subject to any disclaimer, the term of this patent is extended or adjusted under 35 U.S.C. 154(b) by 136 days.

(21) Appl. No.: 12/837,338

(22) Filed: Jul. 15, 2010

(65) Prior Publication Data

US 2010/0277416 A1    Nov. 4, 2010

Related U.S. Application Data

(63) Continuation of application No. 11/859,505, filed on Sep. 21, 2007, now Pat. No. 7,778,818, which is a continuation of application No. 10/677,890, filed on Oct. 1, 2003, now Pat. No. 7,286,115, which is a continuation-in-part of application No. 10/205,950, filed on Jul. 25, 2002, now Pat. No. 6,970,599, which is a continuation of application No. 09/580,319, filed on May 26, 2000, now Pat. No. 6,801,190.

(60) Provisional application No. 60/461,735, filed on Apr. 9, 2003, provisional application No. 60/136,613, filed on May 27, 1999.

(51) Int. Cl.
G09G 5/00    (2006.01)

(52) U.S. Cl. ........ 345/156; 345/168; 345/169; 345/171; 455/566; 715/773

(58) Field of Classification Search .................. 345/156, 345/157, 173–179, 168; 455/550, 566; 715/773
See application file for complete search history.

(56) References Cited

U.S. PATENT DOCUMENTS

| | | | |
|---|---|---|---|
| 3,980,869 | A | 9/1976 | Lombardino et al. |
| 4,286,329 | A | 8/1981 | Goertzel et al. |
| 4,365,235 | A | 12/1982 | Greanias et al. |
| 4,439,649 | A | 3/1984 | Cecchi |

(Continued)

FOREIGN PATENT DOCUMENTS

CN    1116335 A    2/1996

(Continued)

OTHER PUBLICATIONS

Min, Kyongho; "Syntactic Revocery and Spelling Correction of Ill-formed Sentences"; Jan. 1998.

(Continued)

*Primary Examiner* — Quan-Zhen Wang
*Assistant Examiner* — Jennifer Nguyen
(74) *Attorney, Agent, or Firm* — Michael A. Glenn; Glenn Patent Group

(57) ABSTRACT

A system associated with a text entry application, such as email or instant messaging, comprises an optional onscreen representation of a circular keyboard, a list of potential linguistic object matches, and a message area where the selected words are entered. The circular keyboard is manipulated via a hardware joystick or game-pad with analog joystick or omni-directional rocker switch built therein. The user points the joystick in the general direction of the desired letter, and then continues pointing roughly to each letter in the desired word. Once all letters have been roughly selected, buttons are used to select a specific word from the list of potential matches and send the selected word to the message area.

3 Claims, 5 Drawing Sheets

U.S. PATENT DOCUMENTS

| | | | |
|---|---|---|---|
| 4,454,592 A | 6/1984 | Cason et al. |
| 4,559,598 A | 12/1985 | Goldwasser et al. |
| 4,561,105 A | 12/1985 | Crane et al. |
| 4,573,196 A | 2/1986 | Crane et al. |
| 4,689,768 A | 8/1987 | Heard et al. |
| 4,710,758 A | 12/1987 | Mussler et al. |
| 4,725,694 A | 2/1988 | Auer et al. |
| 4,782,464 A | 11/1988 | Gray et al. |
| 4,783,758 A | 11/1988 | Kucera |
| 4,783,761 A | 11/1988 | Gray et al. |
| 4,891,777 A | 1/1990 | Lapeyre |
| 4,891,786 A | 1/1990 | Goldwasser |
| 5,109,352 A | 4/1992 | O'Dell |
| 5,127,055 A | 6/1992 | Larkey |
| 5,187,480 A | 2/1993 | Thomas et al. |
| 5,224,179 A | 6/1993 | Denker et al. |
| 5,261,112 A | 11/1993 | Futatsugi et al. |
| 5,305,205 A | 4/1994 | Weber et al. |
| 5,317,507 A | 5/1994 | Gallant |
| 5,347,295 A | 9/1994 | Agulnick et al. |
| 5,457,454 A | 10/1995 | Sugano |
| 5,462,711 A | 10/1995 | Ricottone |
| 5,533,147 A | 7/1996 | Arai et al. |
| 5,561,446 A | 10/1996 | Montlick |
| 5,572,423 A | 11/1996 | Church |
| 5,574,482 A | 11/1996 | Niemeier |
| 5,583,946 A | 12/1996 | Gourdol |
| 5,586,198 A | 12/1996 | Lakritz |
| 5,612,690 A | 3/1997 | Levy |
| 5,649,223 A | 7/1997 | Freeman |
| 5,664,896 A | 9/1997 | Blumberg |
| 5,734,750 A | 3/1998 | Arai et al. |
| 5,745,719 A | 4/1998 | Falcon |
| 5,748,512 A | 5/1998 | Vargas |
| 5,754,686 A | 5/1998 | Harada et al. |
| 5,784,008 A | 7/1998 | Raguseo |
| 5,796,867 A | 8/1998 | Chen et al. |
| 5,798,760 A * | 8/1998 | Vayda et al. | 715/834 |
| 5,799,269 A | 8/1998 | Schabes et al. |
| 5,805,911 A | 9/1998 | Miller |
| 5,812,696 A | 9/1998 | Arai et al. |
| 5,812,697 A | 9/1998 | Sakai et al. |
| 5,818,437 A * | 10/1998 | Grover et al. | 715/811 |
| 5,870,492 A | 2/1999 | Shimizu et al. |
| 5,896,321 A | 4/1999 | Miller et al. |
| 5,917,476 A | 6/1999 | Czerniecki |
| 5,923,793 A | 7/1999 | Ikebata |
| 5,926,566 A | 7/1999 | Wang et al. |
| 5,928,588 A | 7/1999 | Chen et al. |
| 5,933,526 A | 8/1999 | Sklarew |
| 5,952,942 A | 9/1999 | Balakrishnan et al. |
| 5,953,541 A | 9/1999 | King et al. |
| 5,956,021 A | 9/1999 | Kubota et al. |
| 5,963,671 A | 10/1999 | Comerford et al. |
| 5,973,676 A | 10/1999 | Kawakura |
| 6,002,390 A | 12/1999 | Masui |
| 6,002,799 A | 12/1999 | Sklarew |
| 6,005,495 A | 12/1999 | Connolly et al. |
| 6,008,799 A | 12/1999 | Van Kleeck |
| 6,009,444 A | 12/1999 | Chen |
| 6,011,554 A | 1/2000 | King et al. |
| 6,018,708 A | 1/2000 | Dahan et al. |
| 6,028,959 A | 2/2000 | Wang et al. |
| 6,037,942 A * | 3/2000 | Millington | 715/835 |
| 6,041,137 A | 3/2000 | Van Kleeck |
| 6,044,165 A | 3/2000 | Perona et al. |
| 6,054,941 A | 4/2000 | Chen |
| 6,075,469 A | 6/2000 | Pong |
| 6,088,649 A * | 7/2000 | Kadaba et al. | 701/538 |
| 6,094,197 A | 7/2000 | Buxton et al. |
| 6,098,034 A | 8/2000 | Razin et al. |
| 6,104,317 A | 8/2000 | Panagrossi |
| 6,104,384 A | 8/2000 | Moon et al. |
| 6,111,573 A | 8/2000 | McComb et al. |
| 6,130,962 A | 10/2000 | Sakurai |
| 6,144,764 A | 11/2000 | Yamakawa et al. |
| 6,148,104 A | 11/2000 | Wang et al. |
| 6,157,379 A | 12/2000 | Singh |
| 6,169,538 B1 | 1/2001 | Nowlan et al. |
| 6,172,625 B1 | 1/2001 | Jin et al. |
| 6,204,848 B1 | 3/2001 | Nowlan et al. |
| 6,212,297 B1 | 4/2001 | Sklarew |
| 6,223,059 B1 | 4/2001 | Haestrup |
| 6,275,611 B1 | 8/2001 | Parthasaranthy |
| 6,278,445 B1 | 8/2001 | Tanaka et al. |
| 6,285,768 B1 | 9/2001 | Ikeda |
| 6,286,064 B1 | 9/2001 | King et al. |
| 6,307,548 B1 | 10/2001 | Flinchem et al. |
| 6,307,549 B1 | 10/2001 | King et al. |
| 6,314,418 B1 | 11/2001 | Namba |
| 6,320,943 B1 | 11/2001 | Borland |
| 6,346,894 B1 | 2/2002 | Connolly et al. |
| 6,362,752 B1 | 3/2002 | Guo et al. |
| 6,392,640 B1 | 5/2002 | Will |
| 6,424,743 B1 | 7/2002 | Ebrahimi |
| 6,437,709 B1 | 8/2002 | Hao |
| 6,448,987 B1 | 9/2002 | Easty et al. |
| 6,453,079 B1 | 9/2002 | McInerny |
| 6,489,951 B1 | 12/2002 | Wong et al. |
| 6,493,464 B1 | 12/2002 | Hawkins et al. |
| 6,502,118 B1 | 12/2002 | Chatterjee |
| 6,542,170 B1 | 4/2003 | Williams et al. |
| 6,549,219 B2 | 4/2003 | Selker |
| 6,567,072 B2 | 5/2003 | Watanabe |
| 6,585,162 B2 | 7/2003 | Sandbach et al. |
| 6,611,252 B1 | 8/2003 | Dufaux |
| 6,616,703 B1 | 9/2003 | Nakagawa |
| 6,643,647 B2 | 11/2003 | Natori |
| 6,654,733 B1 | 11/2003 | Goodman et al. |
| 6,686,852 B1 | 2/2004 | Guo |
| 6,686,907 B2 | 2/2004 | Su et al. |
| 6,711,290 B2 | 3/2004 | Sparr et al. |
| 6,757,544 B2 | 6/2004 | Rangarajan et al. |
| 6,765,554 B2 | 7/2004 | Millington |
| 6,765,567 B1 | 7/2004 | Roberson et al. |
| 6,801,190 B1 | 10/2004 | Robinson et al. |
| 6,801,659 B1 | 10/2004 | O'Dell |
| 6,807,529 B2 | 10/2004 | Johnson et al. |
| 6,819,315 B2 | 11/2004 | Toepke et al. |
| 6,820,075 B2 | 11/2004 | Shanahan et al. |
| 6,829,607 B1 | 12/2004 | Tafoya et al. |
| 6,864,809 B2 | 3/2005 | O'Dell et al. |
| 6,904,402 B1 | 6/2005 | Wang et al. |
| 6,912,581 B2 | 6/2005 | Johnson et al. |
| 6,947,771 B2 | 9/2005 | Guo et al. |
| 6,955,602 B2 | 10/2005 | Williams |
| 6,956,968 B1 | 10/2005 | O'Dell et al. |
| 6,970,599 B2 | 11/2005 | Longe et al. |
| 6,973,332 B2 | 12/2005 | Mirkin et al. |
| 6,982,658 B2 | 1/2006 | Guo |
| 6,990,534 B2 | 1/2006 | Mikhailov et al. |
| 7,020,270 B1 | 3/2006 | Ghassabian |
| 7,020,849 B1 | 3/2006 | Chen |
| 7,030,863 B2 | 4/2006 | Longe et al. |
| 7,057,607 B2 | 6/2006 | Mayoraz et al. |
| 7,075,520 B2 | 7/2006 | Williams |
| 7,088,345 B2 | 8/2006 | Robinson et al. |
| 7,088,861 B2 | 8/2006 | Van Meurs |
| 7,095,403 B2 | 8/2006 | Lyustin et al. |
| 7,107,204 B1 | 9/2006 | Liu et al. |
| 7,117,144 B2 | 10/2006 | Goodman et al. |
| 7,139,430 B2 | 11/2006 | Sparr et al. |
| 7,149,550 B2 | 12/2006 | Kraft et al. |
| 7,151,533 B2 | 12/2006 | Van Ieperen |
| 7,155,683 B2 | 12/2006 | Williams |
| 7,162,305 B2 | 1/2007 | Tong et al. |
| 7,177,797 B1 | 2/2007 | Micher et al. |
| 7,224,989 B2 | 5/2007 | Kraft |
| 7,256,769 B2 | 8/2007 | Pun et al. |
| 7,257,528 B1 | 8/2007 | Ritchie et al. |
| 7,272,564 B2 | 9/2007 | Phillips et al. |
| 7,275,029 B1 | 9/2007 | Gao et al. |
| 7,277,088 B2 | 10/2007 | Robinson et al. |
| 7,283,999 B1 | 10/2007 | Ramesh et al. |
| 7,286,115 B2 * | 10/2007 | Longe et al. | 345/168 |
| 7,293,231 B1 | 11/2007 | Gunn et al. |
| 7,313,277 B2 | 12/2007 | Morwing et al. |

| | | |
|---|---|---|
| 7,349,576 B2 | 3/2008 | Hotsberg |
| 7,385,531 B2 | 6/2008 | Zhang |
| 7,389,235 B2 | 6/2008 | Dvorak |
| 7,437,001 B2 | 10/2008 | Morwing et al. |
| 7,453,439 B1 | 11/2008 | Kushler et al. |
| 7,466,859 B2 | 12/2008 | Chang et al. |
| 7,584,173 B2 | 9/2009 | Bax et al. |
| 7,720,682 B2 | 5/2010 | Stephanick et al. |
| 7,750,891 B2 | 7/2010 | Stephanick et al. |
| 7,778,818 B2* | 8/2010 | Longe et al. ............ 704/9 |
| 7,821,503 B2 | 10/2010 | Stephanick et al. |
| 7,920,132 B2 | 4/2011 | Longe et al. |
| 2001/0048425 A1 | 12/2001 | Partridge |
| 2002/0093491 A1 | 7/2002 | Gillespie et al. |
| 2002/0122072 A1 | 9/2002 | Selker |
| 2002/0135499 A1 | 9/2002 | Guo |
| 2002/0135561 A1 | 9/2002 | Rojewski |
| 2002/0145587 A1 | 10/2002 | Watanabe |
| 2002/0163544 A1 | 11/2002 | Baker et al. |
| 2002/0168107 A1 | 11/2002 | Tang et al. |
| 2002/0188448 A1 | 12/2002 | Goodman et al. |
| 2003/0006956 A1 | 1/2003 | Wu et al. |
| 2003/0011574 A1 | 1/2003 | Goodman |
| 2003/0023426 A1 | 1/2003 | Pun et al. |
| 2003/0033288 A1 | 2/2003 | Shanahan et al. |
| 2003/0048257 A1 | 3/2003 | Mattila |
| 2003/0054830 A1 | 3/2003 | Williams et al. |
| 2003/0144830 A1 | 7/2003 | Williams |
| 2003/0179930 A1 | 9/2003 | O'Dell et al. |
| 2003/0184451 A1 | 10/2003 | Li |
| 2003/0234766 A1 | 12/2003 | Hildebrand |
| 2004/0153963 A1 | 8/2004 | Simpson et al. |
| 2004/0153975 A1 | 8/2004 | Williams et al. |
| 2004/0163032 A1 | 8/2004 | Guo et al. |
| 2004/0243389 A1 | 12/2004 | Thomas et al. |
| 2004/0260694 A1 | 12/2004 | Chaudhuri et al. |
| 2005/0060138 A1 | 3/2005 | Wang et al. |
| 2005/0114770 A1 | 5/2005 | Sacher et al. |
| 2005/0135678 A1 | 6/2005 | Wecker et al. |
| 2005/0169527 A1 | 8/2005 | Longe et al. |
| 2005/0174333 A1 | 8/2005 | Robinson et al. |
| 2005/0190970 A1 | 9/2005 | Griffin |
| 2005/0210383 A1 | 9/2005 | Cucerzan et al. |
| 2005/0223308 A1 | 10/2005 | Gunn et al. |
| 2006/0062461 A1 | 3/2006 | Longe et al. |
| 2006/0129928 A1 | 6/2006 | Qiu |
| 2006/0136408 A1 | 6/2006 | Weir et al. |
| 2006/0155536 A1 | 7/2006 | Williams et al. |
| 2006/0158436 A1 | 7/2006 | LaPointe et al. |
| 2006/0173807 A1 | 8/2006 | Weir et al. |
| 2006/0176283 A1 | 8/2006 | Suraqui |
| 2006/0190819 A1 | 8/2006 | Ostergaard et al. |
| 2006/0193519 A1 | 8/2006 | Sternby |
| 2006/0236239 A1 | 10/2006 | Simpson et al. |
| 2006/0239560 A1 | 10/2006 | Sternby |
| 2006/0247915 A1 | 11/2006 | Bradford et al. |
| 2006/0274051 A1 | 12/2006 | Longe et al. |
| 2007/0016616 A1 | 1/2007 | Brill |
| 2007/0040813 A1 | 2/2007 | Kushler |
| 2007/0050360 A1 | 3/2007 | Hull et al. |
| 2007/0094718 A1 | 4/2007 | Simpson |
| 2007/0203879 A1 | 8/2007 | Templeton-Steadman et al. |
| 2007/0203894 A1 | 8/2007 | Jones et al. |
| 2007/0276653 A1 | 11/2007 | Greenwald et al. |
| 2007/0276814 A1 | 11/2007 | Williams |
| 2007/0285397 A1 | 12/2007 | LaPointe et al. |
| 2008/0100579 A1 | 5/2008 | Robinson et al. |
| 2008/0130996 A1 | 6/2008 | Sternby |
| 2008/0133222 A1 | 6/2008 | Kogan et al. |
| 2008/0291059 A1 | 11/2008 | Longe |
| 2009/0007001 A1 | 1/2009 | Morin et al. |
| 2009/0037399 A1 | 2/2009 | Bartz et al. |
| 2009/0089665 A1 | 4/2009 | White et al. |
| 2009/0105959 A1 | 4/2009 | Braverman et al. |
| 2009/0226098 A1 | 9/2009 | Takahashi et al. |
| 2009/0234826 A1 | 9/2009 | Bidlack |
| 2009/0284471 A1 | 11/2009 | Longe et al. |
| 2010/0082343 A1 | 4/2010 | Levit et al. |
| 2010/0257478 A1 | 10/2010 | Longe et al. |
| 2010/0325136 A1 | 12/2010 | Chaudhuri et al. |
| 2011/0193797 A1 | 8/2011 | Unruh |
| 2011/0234524 A1 | 9/2011 | Longe |

FOREIGN PATENT DOCUMENTS

| | | |
|---|---|---|
| CN | 1190205 A | 8/1998 |
| CN | 1232204 A | 10/1999 |
| CN | 1358299 A | 7/2002 |
| CN | 1606753 | 4/2005 |
| DE | 3401942 | 11/1984 |
| EP | 0114250 | 11/1983 |
| EP | 0739521 | 5/1996 |
| EP | 0762265 | 3/1997 |
| EP | 0858023 | 8/1998 |
| EP | 0961208 | 12/1999 |
| EP | 1018679 | 12/1999 |
| EP | 1085401 | 3/2001 |
| EP | 1168780 | 1/2002 |
| EP | 1355225 | 10/2003 |
| FR | 2824979 | 11/2002 |
| JP | 57010832 | 1/1982 |
| JP | 1985-204065 | 10/1985 |
| JP | 62065136 | 3/1987 |
| JP | 1023021 | 1/1989 |
| JP | 1047565 | 2/1989 |
| JP | 1993-027896 | 2/1993 |
| JP | 1993-081482 | 4/1993 |
| JP | 1993-233600 | 9/1993 |
| JP | 1994-083512 | 3/1994 |
| JP | 1994-083816 | 3/1994 |
| JP | 6083816 | 3/1994 |
| JP | 7094376 | 4/1995 |
| JP | 1995-146918 | 6/1995 |
| JP | 7146918 | 6/1995 |
| JP | 1996-305701 | 11/1996 |
| JP | 8305701 | 11/1996 |
| JP | 8319721 | 12/1996 |
| JP | 1997-185612 | 7/1997 |
| JP | 1998-143309 | 5/1998 |
| JP | 10135399 | 5/1998 |
| JP | 1998-154144 | 6/1998 |
| JP | 10-275046 | 10/1998 |
| JP | A1998-275046 | 10/1998 |
| JP | 11021274 | 1/1999 |
| JP | 11028406 | 2/1999 |
| JP | 1999-338858 | 12/1999 |
| JP | 11338858 | 12/1999 |
| JP | 2001-043205 | 2/2001 |
| JP | 2001-282778 | 10/2001 |
| JP | 2002-244803 | 8/2002 |
| JP | 2003-005888 | 1/2003 |
| JP | A2003-500771 | 1/2003 |
| JP | 2003-533816 | 11/2003 |
| KR | 2001-0107388 | 12/2001 |
| KR | 20020004419 | 1/2002 |
| TW | 498264 B | 8/2002 |
| WO | WO97/05541 | 2/1997 |
| WO | WO 98/16889 | 4/1998 |
| WO | WO 99/15952 | 4/1999 |
| WO | WO 00/72300 | 11/2000 |
| WO | WO 0074240 | 12/2000 |
| WO | WO01/88680 | 11/2001 |
| WO | WO 03/021788 | 3/2003 |
| WO | WO 2004/111812 | 12/2004 |
| WO | WO 2004/111871 | 12/2004 |
| WO | WO 2006/026908 | 2/2006 |

OTHER PUBLICATIONS

Kukich, Karen; "Techniques for Automatically Correcting Words in Text"; Dec. 1992; ACM Computing Surveys, vol. 24, pp. 377-439.

John Arnott, "Probabilistic Character Disambiguation for Reduced Keyboards Using Small Text Samples," Sep. 1992, AAC Augmentative and Alternative Communication, vol. 8, No. 3, pp. 215-223.

Amin, A., et al., "Recognition of Hand-printed Chinese Characters Using Decision Trees/Machine Learning of C4.5 System," 1998, Pattern Analysis and Applications, pp. 130-141, vol. 1, Issue 2.

Chen, Ju-Wei, et al., "A Hierarchical Representation for the Reference Database of On-Line Chinese Character Recognition," Aug. 20-23, 1996, INSPEC Abstract No. C9702-1250B-021.

Cheng, Rei-Heng, et al., "Recognition of Radicals in Handwritten Chinese Characters by Means of Problem Reduction and Knowledge Guidance," Sep. 1996, International Journal of Pattern Recognition and Artificial Intelligence, INSPEC Abstract No. C9706-5260B-280.

Chou, Kuo-Sen, et al., "Radical-Based Neighboring Segment Matching for On-Line Chinese Character Recognition," Aug. 25-26, 1996, Proceedings of the 13th International Conference on Pattern Recognition; INSPEC Abstract No. B9701-6140C-682, C9701-1250B-019.

Chou, Kuo-Sen, et al., "Radical-Based Neighboring Segment Matching for On-Line Chinese Character Recognition"; Apr. 1997, Computer Processing of Oriental Languages, INSPEC Abstract No. B9701-6140C-682, C9701-1250B-019.

Connell, S., et al., "Template-based Online Character Recognition"; Aug. 10, 1999; Department of Computer Science and Engineering, Michigan State University, East Lansing, Michigan.

Fan, Fang, et al., "An On-Line Handwritten Chinese Character Recognition System", Jan. 26-27, 2000, Proceedings of the SPIE—The International Society for Optical Engineering, INSPEC Abstract No. C2000-12-5260B-085.

Hung, Kwok-Wah, et al., "Boxing Code for Stroke-Order Free Handprinted Chinese Characters Recognition"; Oct. 8-11, 2000, Proceedings of IEEE International Conference on Systems, Man, Cybernetics, INSPEC Abstract No. C2001-01-5260B-087.

Kim, Ki-Cheol, et al., "On-Line Recognition of Stroke-Order Free Cursive Chinese Characters with Relaxation Matching", Mar. 1995; Journal of the Korea Information Science Society, INSPEC Abstract No. C9507-1250B-022.

Li, Xiaolin, et al., "On-Line Handwritten Alphanumeric Character Recognition Using Feature Sequences", 1995; Department of Computer Science, Hong Kong University of Science and Technology, Clear Water Bay, Kowloon, Hong Kong.

Lin, Chang-Keng, et al., "Stroke-Order Independent On-Line of Handwritten Chinese Characters"; Nov. 8-10, 1989, Proceedings of the SPIE—The International Society for Optical Engineering, INSPEC Abstract No. C90031813.

Liu, J.Z., et al., "Two-layer Assignment Method for Online Chinese Character Recognition", Feb. 2000, IEEE Proceedings-Vision, Image and Signal Processing, INSPEC Abstract No. C2000-06-1250B-004.

Liu, Jianzhuang, et al., "Stroke Order and Stroke Number Free On-Line Chinese Character Recognition Using Attributed Relational Graph Matching", Aug. 25-29, 1996 Proceedings of the 13th International Conference on Pattern Recognition, INSPEC Abstract No. C9701-1250B-035.

Naito, S., et al., "Rough Classification for Handprinted Chinese Characters by Stroke Density"; Aug. 1981; Transactions of the Institute of Electronics and Communication Engineers of Japan, INSPEC Abstract No. C82009693.

Nambu, H., et al., "On-Line Chinese Handwriting Character Recognition: Comparison with Japanese Kanji Recognition and Improvement of Input Efficiency", Aug. 1999; Transactions of the Information Processing Society of Japan, INSPEC Abstract No. B2000-01-6135E-035, C2000-01-5260B-099.

Odaka, K., et al., "Stroke Order Free On-Line Handwritten Character Recognition of Algorithm", Jun. 1982, Transactions of the Institute of Electronics and Communication Engineers of Japan, Section E, INSPEC Abstract No. C82041007.

Pan, Bao-Chang, et al., "Recognition of Handprinted Chinese Characters by Stroke Order Codes", Aug. 29-Sep. 1, 1988, International Conference on Computer Processing of Chinese and Oriental Languages, INSPEC Abstract No. C89024386.

Park, Hee-Seon, et al., "An On-line Recognition System for Cursive Chinese Characters with Effective Coarse Classification and Elastic Matching", Sep. 1993, Journal of the Korea Information Science Society, INSPEC Abstract No. C9404-1250B-001.

Romero, R., et al., "Optical Chinese Character Recognition using Probabilistic Neural Networks", Jul. 1996; Imaging Systems Lab, Robotics Institute, Carnegie Mellon University, Pittsburgh, PA, pp. 1-18.

Seni, G., et al., "Large Vocabulary Recognition of On-Line Handwritten Cursive Words", Jun. 1996; presented at IEEE Transactions on Pattern Analysis and Machine Intelligence.

Shin, J., "Online Handwriting Character Analysis Using Stroke Correspondence Search," Sep. 2001, Journal of Shanghai University, Aizu University, Fukushima, Japan, INSPEC Abstract No. C2001-11-1250B-012.

Srihari, S., et al., "Cherry Blossom: A System for Japanese Character Recognition," 1997; Center for Excellence for Document Analysis and Recognition, State University of New York at Buffalo, Buffalo, NY.

Stockton, R. et al., "JKanli: Wavelet-based Interactive Kanji Competition," Sep. 3-7, 2000, Proceedings of the 15th International Conference on Pattern Recognition.

"Quick Stroke Information," Synaptics, retrieved on Nov. 18, 2006 from website: www.synaptics.com/products/quickstroke_faq.cfm and www.synaptics.com/products/quickstroke.cfm.

Vuurpijl, L. et al., "Coarse Writing-Style Clustering Based on Simple Stroke-Related Features," 1997; Institute for Cognition and Information, University of Nijmegen, Nijmegen, The Netherlands.

Zheng, Jing, et al., "Recognizing On-Line Handwritten Chinese Character Via FARG Matching," Aug. 18-20, 1997, Proceedings of the Fourth International Conference on Document Analysis and Recognition, INSPEC Abstract No. B9711-6140C-162, C971-5260B-123.

Shumin Zhai and Per-Ola Kristensson, *Shorthand Writing on Stylus Keyboard*, Apr. 5-10, 2003, CHI 3003, 5(1): 97-104, 2003.

Jennifer Mankoff and Gregory D. Abowd, *Error Correction Techniques for Handwriting, Speech and other Ambiguous or Error Prone Systems*, Jun. 1999; GVU TechReport, GIT-GVU-99-18.

Jennifer Mankoff and Gregory D. Abowd, *Cirrin: A Word-Level Unistroke Keyboard for Pen Input*, Nov. 1-4, 1998; Proceedings of UIST 1998, Technical note. pp. 213-214.

K. Perlin, *Quikwriting: Continuous Stylus-Based Text Entry*; Nov. 1-4, 1998 presented at ACM UIST'98 Conference, pp. 215-216.

M. Garrett, D. Ward, I. Murray, P. Cowans, and D. Mackay, *Implementation of Dasher, an Information Efficient Input Mechanism*; Jul. 11, 2003; presented at LINUX 2003 Conference, Edinburgh, Scotland.

P. Isokoski and R. Raisamo, *Device Independent Text Input: A Rationale and an Example*; May 23-26, 2000;Proceedings of the Working Conference on Advanced Visual Interfaces AVI2000, pp. 76-83, Palermo, Italy, 2000.

P. Isokoski, *Text Input Methods for Eye Trackers Using Off-Screen Targets*; Nov. 6-8, 2000; In Proceedings of Eye Tracking Research & Applications Symposium 2000, pp. 15-21. ACM, 2000.

P. Isokoski, *Model for Unistroke Writing Time*; Mar. 31-Apr. 5, 2001; CHI Letters: Human Factors in Computing Systems, SIGCHI 2001, 3(1):357-364, 2001.

P. Isokoski and M. Käki. *Comparison of Two Touchpad-Based Methods for Numeric Entry*; Apr. 20-25, 2002; CHI Letters: Human Factors in Computing Systems, CHI 2002, 4(1): 25-32.

P. Isokoski and I. Scott MacKenzie, *Text Entry on Mobile Systems: Directions for the Future*; Mar. 31-Apr. 5, 2001;CHI 2001 Extended Abstracts, p. 495.

P. Isokoski and I. S. MacKenzie; *Report on the CHI2001 Workshop on Text Entry on Mobile Systems*; Sep./Oct. 2001; SIGCHI Bulletin, p. 14.

P., Isokoski and I. S. MacKenzie. *Combined Model for Text Entry Rate Development*; Apr. 5-10, 2003; CHI2003 Extended Abstracts, pp. 752-753.

P. Isokoski and R. Raisamo, *Architecture for Personal Text Entry Methods*; 2003; In Closing the Gap: Software Engineering and Human-Computer Interaction, pp. 1-8. IFIP.

*Handbook for the Palm V™ Organizer*; 1998-1999; Palm Computing, Inc., Santa Clara, CA.

Masui, T.; "An Efficient Text Input method for Pen-based Computers"; Apr. 1998; Proceedings of the ACM Conf. On Human Factors in Computing Systems (CHI'98), ACM Press, pp. 328-335.

Masui, T.; "POBox: An Efficient Text Input Method for Handheld and Ubiquitous Computers"; Apr. 1998; Sony Computer Science Laboratories.

Pilot POBox (Jul. 1997); Printout form dated Jan. 30, 1920 from http://www.csl.sony.co.jp/person/maui/POBox/ilot.html; no translation provided.

POBox Example2: Printout form dated Jan. 30, 1920 from http://www.csl.sony..co.jp/person/masui/POBox/example2.html; no translation provided.

Softava Q12 Mobile's Keypad; Printout dated Oct. 24, 2006; http://www.softava.com/q12.

"What is Fastap; What Fastap Does; How it Works", retrieved online on Oct. 24, 2006 from url: www.digitwireless.com, 3 pages.

Kristensson, et al., "Relaxing Stylus Typing Precision by Geometric Pattern Matching", ACM Proc. of the 10th Int'l Conf. on Intelligent User Interfaces, Jan. 9, 2005, pp. 151-158.

Mollineda, et al., "A Windowed Weighted Approach for Approximate Cyclic String Matching", Google, Presented at the 16th Int'l Conference on Pattern Recognition, Aug. 11, 2002, pp. 188-191.

Quixal, et al., "Strategies for the generation of individualized feedback in distance language learning", Google 2007, pp. 1-8.

Sarr, , "Improving Precision and Recall using a Spellchecker in a Search Engine", Master's Thesis, Google 2003, pp. 1-39.

* cited by examiner

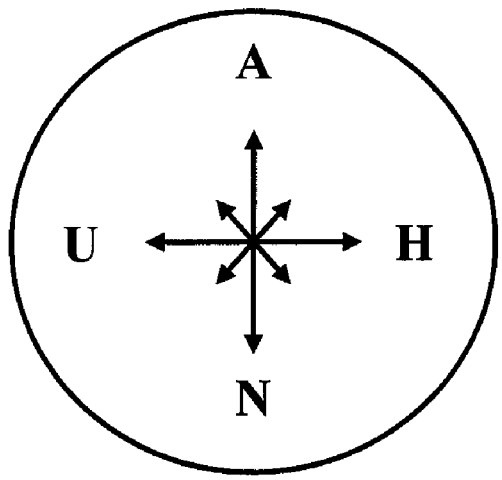
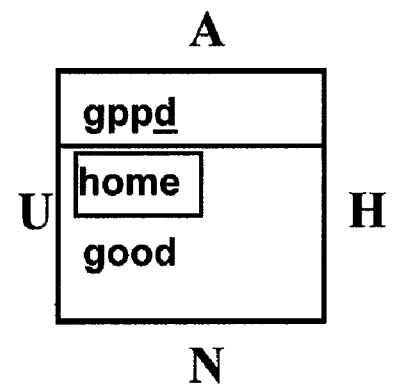
FIG. 4A  FIG. 4B
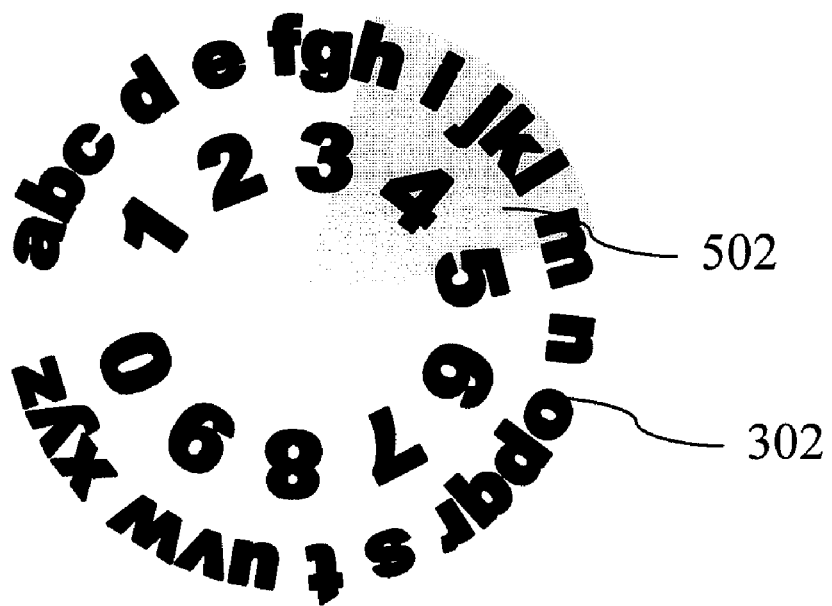
FIG. 5

DIRECTIONAL INPUT SYSTEM WITH AUTOMATIC CORRECTION

CROSS-REFERENCE TO RELATED APPLICATIONS

This application is a Continuation of U.S. Ser. No. 11/859,505 filed Sep. 21, 2007, (now U.S. Pat. No. 7,778,818), which is a Continuation of U.S. Ser. No. 10/677,890, (now U.S. Pat. No. 7,286,115), filed Oct. 1, 2003, which claims the benefit of U.S. Ser. No. 60/461,735, filed Apr. 9, 2003; all of which are herein incorporated in their entirety by this reference thereto.

This application is a continuation-in-part of U.S. Ser. No. 10/205,950, (now U.S. Pat. No. 6,970,599), filed Jul. 25, 2002, which is a Continuation of U.S. Ser. No. 09/580,319, filed on May 26, 2000, (now U.S. Pat. No. 6,801,190), which claims the benefit of U.S. Ser. No. 60/136,613, filed May 27, 1999, all of which are herein incorporated in their entirety by this reference thereto.

BACKGROUND OF THE INVENTION

1. Technical Field

This invention relates generally to input devices. More particularly, the invention relates to a directional input system with automatic correction.

2. Description of Related Arts

To operate a computing device, such as a computer, one or more input devices must be connected thereto. Since the early days of the computing age, the keyboard has been the primary input device for users to input textual messages into to computing devices. The textual messages may be commands for the computers to execute, or just plain data entry if he's using a keyboard as an input device. However, the user must memorize the correct spelling and syntax of computer commands. Even if the user has memorized the correct spelling, the input of data with keyboard itself can be error prone. Hence, a graphical user interface (GUI) has been developed for computing devices to reduce the use of keyboard. In a GUI, the user operates an alternative input device, such as a mouse, trackball, or joystick, to move around a cursor or pointer on the display. Once the cursor is moved to the desired position, a button is pressed and released, and a corresponding computer command is thus executed. Although a GUI provides an alternative way to invoke computer commands, the keyboard continues to serve as the primary text entry input device for computing devices.

Nevertheless, there are situations such as in console video-game machines or hand held devices with a joystick or joystub, where a traditional keyboard is neither available nor convenient. Currently, the text entry method for these systems usually consists of scrolling through an alphabet or on-screen QWERTY keyboard. Another commonly adopted navigation means in video-game machines provides users with a pie menu, which is a circular menu that allows users choose items by dragging the pointing device in the direction of the menu item. To input a word, the user must select each letter by scrolling through an alphabet list, navigating through the pie menu, or locating it on the on-screen keyboard and click a selection button after each letter is located.

The above text entry method has numerous disadvantages. For example: the method is inefficient because the user has to spend time in locating the letter and confirming the letter; the method is inconvenient because it breaks the normal typing flow when inserting clicks between letter selections; and the method is ineffective because the user could easily mistake an adjacent letter for the limited size of the on-screen keyboard.

What is desired is an effective text entry input system using a directional input means such as a joystick or trackball device. It is further desired that the text entry input system is intuitive and easy to operate. It is still further desired that the text entry input system can provide auto-correction of input mistakes.

SUMMARY OF THE INVENTION

The invention provides a directional input system associated with a text entry application, such as email or instant messaging. The system comprises an optional onscreen representation of a circular keyboard, a list of potential linguistic object matches, and a message area where the selected words are entered. The circular keyboard is manipulated via a hardware joystick or game-pad having an analog joystick or omnidirectional rocker switch built therein. The user points the joystick in the general direction of the desired letter, and then continues pointing roughly to each letter in the desired word. Once all letters have been roughly selected, buttons or equivalent means are used to select a specific word from the list of potential matches and to send the selected word to the message area.

In one preferred embodiment, the invention provides a text entry input system which includes: (1) a directional selection means, plus one or more buttons or equivalent user input means; (2) a list of linguistic objects, organized by frequency of use; (3) an output device with a text display area; and (4) a processor which includes an object search engine, a distance or angular value calculation module, word module for evaluating and ordering words, and a selection component.

The directional selection means is used to point in the direction of each letter of a word. The processor calculates a distance or an angle to find letters and weight values for the letters in the pointing direction with the distance or the angle calculation module, retrieves a predicted list of words based on the letters and weight values with the object search engine, and evaluates and orders the predicted list of words with the word module. The selection component is used to select a desired word from the predicted list of words.

In another preferred embodiment, the invention provides a text entry input method using a directional selection means. The method includes the steps of:

The user moving a cursor on an on-screen keyboard in the direction of a desired letter using the directional input means;

Recording the X-Y coordinate position of the cursor;

Converting the recorded X-Y coordinate position into the corresponding set of polar coordinates;

Applying a selection weight value to each input based on the set of polar coordinates of the recorded cursor position; and Retrieving a list of predicted words from a vocabulary database based on the weight value for each input and a plurality of pre-determined values.

BRIEF DESCRIPTION OF THE DRAWINGS

FIG. 4A is a schematic view of a set of compass points according to one embodiment of the invention;

FIG. 4B is a schematic view of a set of compass points around the word selection list according to another embodiment of the invention;

FIG. 5 is a schematic view of an on-screen feedback of the directional input system according to the invention;

DETAILED DESCRIPTION OF THE INVENTION

The invention provides a directional input system associated with a text entry application, such as email or instant messaging. The system includes an optional onscreen representation of a circular keyboard, a list of potential linguistic object matches, and a message area where the selected words are entered. The circular keyboard is manipulated via a hardware joystick or game-pad having an analog joystick or omni-directional rocker switch built therein. The user points the joystick in the general direction of the desired letter, and then continues pointing roughly to each letter in the desired word. Once all letters have been roughly selected, buttons or equivalent means are used to select a specific word from the list of potential matches and send the selected word to the message area.

System Construction and Basic Operation

Figure 1:
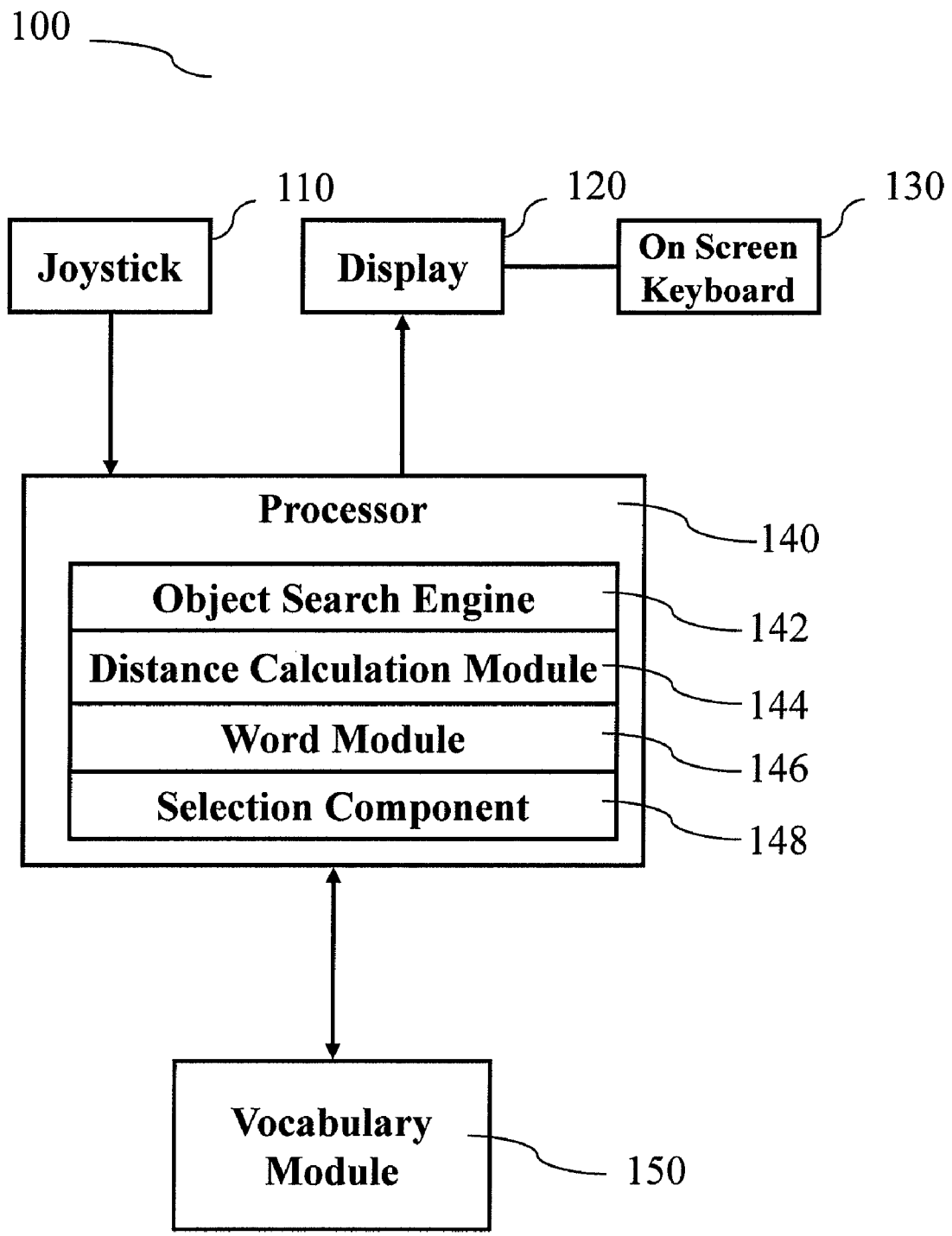
FIG. 1 is a block diagram illustrating a directional input system according to the invention.

FIG. 1 is a block schematic diagram illustrating a directional input system 100 incorporated in a home video game console machine according to the preferred embodiment of this invention. The input system 100 includes an analog joystick 110 having one or more buttons, a vocabulary module 150 which stores a collection of linguistic objects, a display device 120 having a text display area, and a processor 140. The processor 140, which connects the other components together, further includes an object search engine 142, a distance calculation module 144 for calculating distance value, a word (linguistic object) module 146 for evaluating and ordering words, and a selection component 148. The system 100 may further include an optional on-screen representation of a keyboard 130 showing on the display device 120.

The joystick 110 serves as a directional selection input device, which provides a possibility of directional input with a sufficient precision, preferably 10° or more precise. It is preferable that the default position of the cursor, if it is shown, is at the center of the circle of letters. It is possible to use a joystick device to navigate in two dimensions an on-screen "QWERTY" or "ABC" keyboard, either in the standard rectangular form or in a circular layout. It is also possible to navigate through multiple concentric rings of characters. It is the goal of this invention, however, to depend only on the joystick in its center/resting position and its non-centered (or perimeter) positions, i.e. using the radial direction rather than the specific degree of tilt.

As soon as a direction has been established by some degree of tilt from the center, the input may be registered and recorded. It may still be beneficial to the user, however, to allow the direction to be altered slightly before recording it. Therefore, the last effective direction is only recorded after the joystick is returned to its resting position in the preferred embodiment of the invention.

Although analog joystick is described as the preferred directional selection device, any input device that provides the possibility of directional input with a sufficient precision can be used. For examples: omni-directional rocker switch, thumbstick, e.g. IBM TrackPoint™, touchpad, touchscreen, touchscreen and stylus combination, trackball, eye tracking device, trapped-disk sliding switch, steering wheel, Apple iPod™ Navigation Wheel, or Sony's Jog-dial and data glove, e.g. old Nintendo Game Glove, can be used as alternative.

The joystick input device preferably has eight buttons. However, it may only have one button, or any other number of buttons. Note that the stick itself does not usually have that many buttons despite the fact that the joystick base or enclosing game controller may have. A 4-way directional hat switch or jog-dial may be used to support multiple functions, both for character input and for secondary navigation. In addition, a joystick may be pressed straight down (z-axis) to provide an additional button.

These buttons provide a mechanism for explicit commands to the system. One of the buttons may invoke a menu which contains additional commands. Another button may change the set of characters which may be selected via the directional input.

In an alternate embodiment, a second joystick or omni directional rocker switch is used to invoke some of the explicit commands of the system. For example, tilting the joystick up and down scrolls through the word choices and tilting it to the right extends the current word with a choice of suffixes.

The linguistic objects that are stored in the vocabulary module 150 include but not limit to: words, phrases, abbreviations, chat slang, emoticons, user IDs, URLs, non-English (such as Chinese or Japanese) characters. Although words are used in the preferred embodiments, any other linguistic objects are equally applicable. Similarly, although the term "letter" or "character" is used in the preferred embodiment, other sub-word components from Non-English languages, e.g. strokes, radicals/components, jamos, kana, plus punctuation symbols and digits, are equally applicable.

The list of predicted words is ordered in accordance with a linguistic model, which may include one or more of: frequency of occurrence of a word in formal or conversational written text; frequency of occurrence of a word when following a preceding word or words; proper or common grammar of the surrounding sentence; application context of current word entry; and recency of use or repeated use of the word by the user or within an application program.

Figure 2:
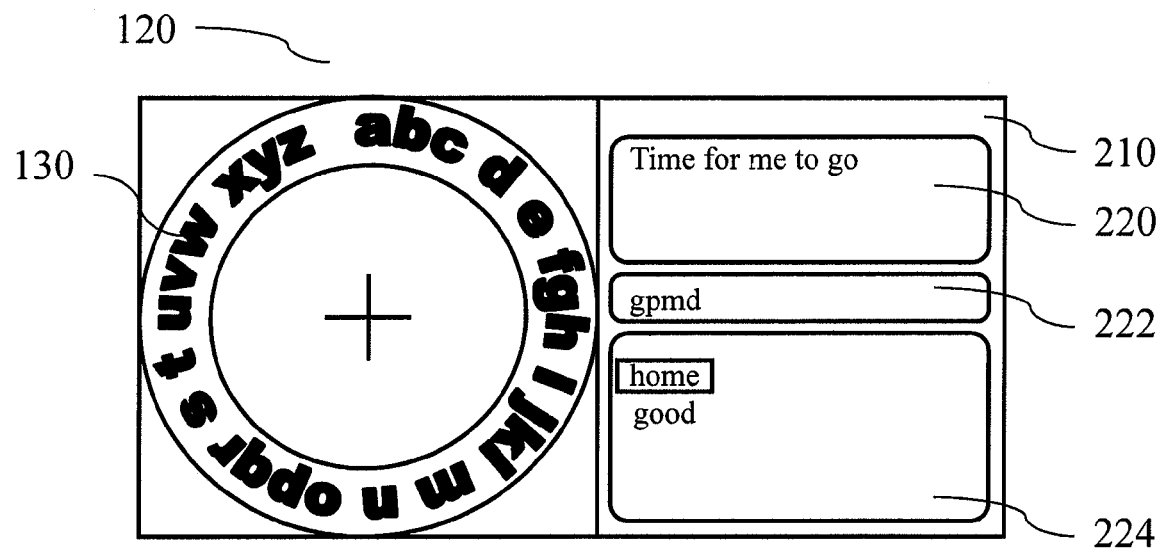
FIG. 2 is a schematic diagram depicting an exemplary screen of the display device corresponding to the directional input system of FIG. 1.

FIG. 2 is a schematic diagram depicting an exemplary screen of the display device 120 corresponding to the directional input system 100 of FIG. 1. The screen includes an on-screen keyboard 130 and a text display area 210. As mentioned above, the on-screen keyboard 130 is optional because if the alphabets are printed around the joystick device, the on-screen keyboard component would be unnecessary.

The on-screen keyboard area can take a variety of shapes, including but not limited to circle, square, oval and polygon with any number of sides. The visual representation is typically, but not limited to, a two-dimensional plane figure.

The on-screen keyboard 130 may be enhanced by, or even replaced with, a set of compass point letters, which are 'A', 'H', 'N' and 'U'. Compass point letters can be placed in a separate compass area on screen as shown in FIG. 4A. They can also be placed around the word selection list as shown in FIG. 4B. These compass pointer letters can also be placed in an interactive pointer/cursor on screen or even around the joystick device 110.

The letters in the on-screen keyboard 130 can be arranged in any order or orientation. In the preferred layout as shown in FIG. 2, all letters have their bottoms towards the center of the ring. In an alternative layout, all letters may be upright. In the preferred layout as shown in FIG. 2, the letters are ordered alphabetically. In an alternative layout, the letters may follow the Dvorak order. In the preferred layout as shown in FIG. 2, the letters start at the 12 o'clock position. In an alternative layout, the letters may start at the 9 o'clock location. Alternatively, the letters may have a moving starting position in a rotating keyboard in an embodiment, for example, where the input device is a type of wheel. In the preferred layout as shown in FIG. 2, the letters are placed clockwise in the character ring. In an alternate layout, the letters may be placed counterclockwise. In the preferred embodiment as shown in FIG. 2, letters occupy different amount of radians depending upon their frequency of use in the language, giving more frequent letters a larger target area.

Likewise, the digits can be arranged in any order or orientation. In the preferred embodiment as shown in FIG. 3, the digits would be located adjacent to the series of letters assigned to the corresponding digit keys on a telephone keypad.

The on-screen keyboard 130 may include letters of a primary input language, letters of alternate input languages (and/or accented letters), digits, and punctuation symbols. The keyboard may also include character components for pictographic languages, diacritics and other "zero-width" characters that attach to preceding characters. The keyboard may further include tone marks, bi-directional characters, functions indicated by a word or symbol, and symbolic representation of a set of characters such as "Smart Punctuation" as described below.

Figure 3:
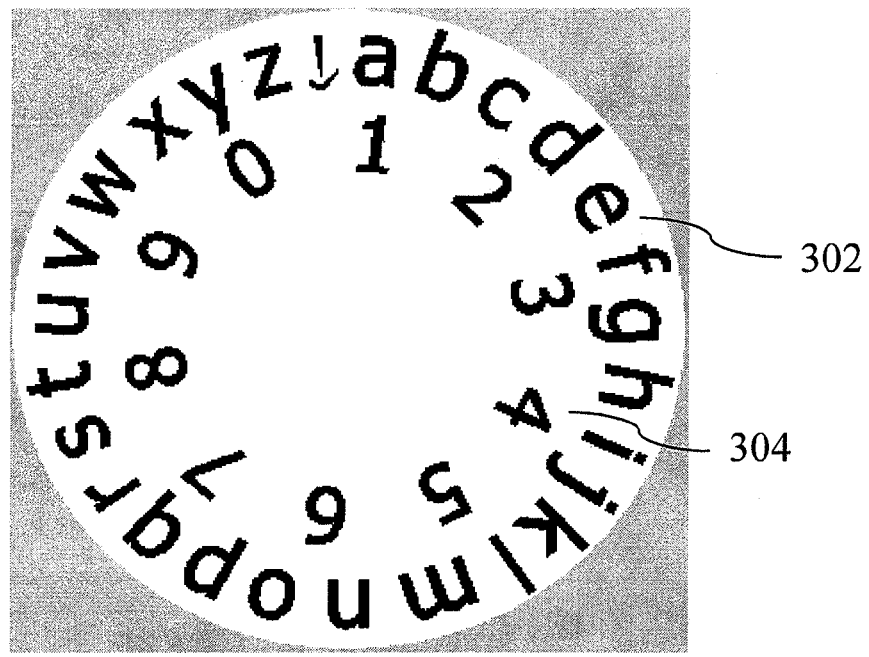
FIG. 3 is a schematic diagram depicting a preferred layout of an on-screen keyboard according to the invention.

The preferred primary text input keyboard as shown in FIG. 3 includes unaccented letters which form an outer ring, digits which form an inner ring, and a symbol or an indicator between the letters "z" and "a", called "Smart Punctuation", which intuitively determines which punctuation is most appropriate based on the word context.

There may be auditory and/or visual feedback on each joystick movement or button press. For example, as soon as the joystick direction is registered, a solid or gradient-fill pie wedge shape could appear on the keyboard, centered on the current direction of tilt. Further, the width of that pie wedge could narrow in proportion to the tilt of the joystick towards the perimeter. The pie wedge could remain momentarily after the joystick is returned to its center/resting position. The pie wedge provides a visual cue that the tilt of the joystick was registered and reinforces the notion that each action represents a range of possible letters. FIG. 5 depicts a visual feedback for a joystick movement. The solid pie wedge 502 on the keyboard 302 shows the current direction of the joystick and the range of letters in that direction.

Referring back to FIG. 2, the text display area 210 includes a word choice list region 224 and a message area 220. The word choice list is a list of words that the system predicts as likely candidates based on the characters entered by ambiguous directional input.

The most likely word is a default word. The user can either accept the default word with one action, or select an alternate word with a combination of actions.

The exact spelling sequence of exact characters coincidentally selected by the user is also displayed. Preferably, the spelling sequence is displayed in a separate area above or below the word choice list. Alternatively, it may be displayed as an entry in the word choice list, typically the first line or the last line. In FIG. 2, the exact spelling sequence 222 is displayed above the word choice list 224.

The last letter entered is also indicated both on the on-screen keyboard and in the exact spell sequence, by some method including but not limited to font change, color change, reverse video or alternate background color, underline, bold face or italics, and outline. Example of outline can be a box or a circle.

All the words on the word choice list, other than the exact spelling sequence at the time when the exact spelling sequence is displayed as the first or last entry, are ordered by a combination of the shortest calculated distances between the joystick entry sequence and each letter in each word and the recency of use and/or the frequency of use within the given language.

The directional input system 100 implements a method whereby the user can select a specific word from the word choice list. Preferably, the method is consistent with other applications use of scrolling methods and selection button. The system also includes a means of selecting the exact spelling sequence as well as any predicted words. In one preferred embodiment, the system may include a next button and a previous button, with which the user can navigate forward and backward through the word choice list.

Alternatively, the directional input system 100 may include a selection mode switch button. When the selection mode switch button is pressed, the system enters a selection mode and the directional input means can be used to scroll forward and backward through the word choice list.

In addition, selecting a predicted word using a particular means may replace the exact spelling sequence as if the letters of the selected word had been entered directly by the user, and a new list of predicted words is generated.

The most likely word is the word added if the user does not try to select a different word. The default word may be a copy of the exact spelling sequence if the user was accurate. Alternatively, it may be the selected word as described above. In addition, the exact spelling sequence may become the default word if a precision method or mode (described below) is used to explicitly choose at least one letter in the sequence.

Words that are longer than the number of joystick actions registered in the current entry sequence may be included in the prediction list. Alternately, a further means can be provided to extend a selected word with completions. For example, longer words that begin with a selected word may appear on a pop-up list after a button press or directional input, similar to the cascading menus on PC windowing systems.

Once a word is entered, the word is typically displayed in the message area 220.

Alternatively, the directional input system 100 can be implemented as an input method editor (IME). In this case, the text entered by the system goes into whatever program is actively accepting input from the system. Other applications may be linked to the system, or the system may be incorporated as part of another application. These applications include but are not limited to: instant messaging, electronic mail, chat programs, web browsing, communication within a video game, supplying text to a video game, as well as word processing.

To enter a text message using the directional input system 100, the user first points the joystick in the general direction of the desired letter, and then continues pointing roughly to each letter in the desired word. Once all letters have been roughly selected, buttons are used to select a specific word from the list of potential matches. The selected word goes into the message area 220, which may be an appropriate text application such as email or instant message.

The invention also provides a method for precisely choosing the letters of a word. The method is useful for entering uncommon names and any word that is not part of the standard language currently active. The method can also be used to change the last character entered by stepping between characters adjacent to the last character entered. To step between characters adjacent to the last character entered, a forward button and a backward button may be used. Once the character entered has been changed, the word choice list refreshes to reflect the changes in the predicted words. Alternatively, the system may be switched to a precision mode and the directional input means may be used to cycle through letters. To switch to the precision mode, the system may choose to use the degree of joystick tilt from the center. Once the tilt exceeds a preconfigured limit, the system switches to the precision mode. Alternatively, the system may use the time interval that the joystick dwells at the perimeter. Once the time interval reaches a preconfigured limit, the system switches to the precision mode and notifies the user through a visual cue or a tone. The system may also include a button for switching to precision mode.

Figure 6:
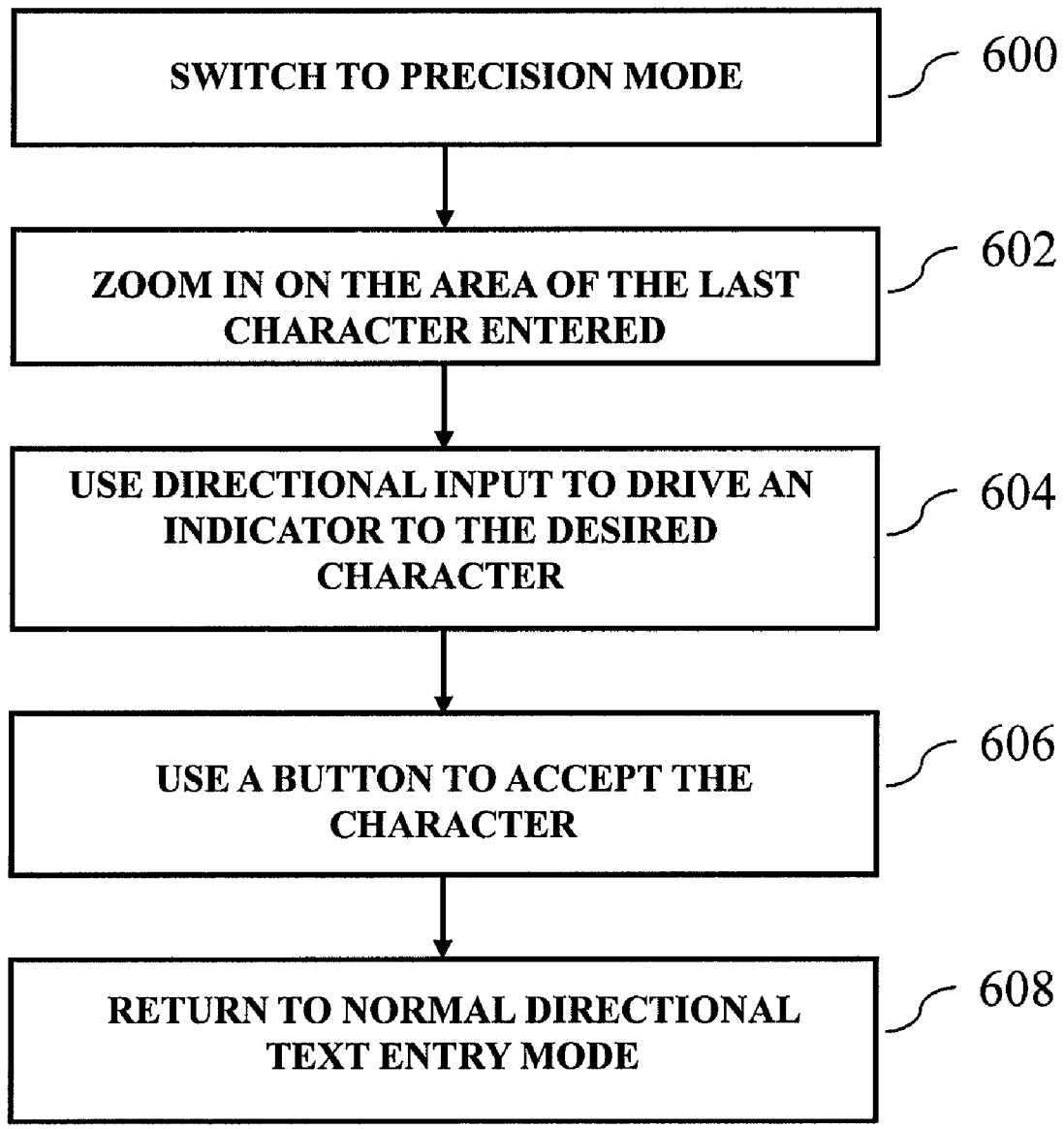
FIG. 6 is a flow diagram illustrating a process for precision input mode of the directional input system according to the invention.

FIG. 6 is a flow diagram illustrating a process for operating the directional input system in the precision mode to select an exact letter. The process includes the following steps:

Step 600: The user switches to precision mode. This is typically a clicking on a predefined button. However, any of the above mentioned method can be used.

Step 602: The system can optionally zoom in on the area of the last character entered.

Step 604: The user uses directional input to drive an indicator to the desired character. If the joystick is used for directional input and if the zoom-in has been employed, then the system processes joystick movement at a finer resolution. For example, a radial move of 90° is treated as if it were only 30°.

Step 606: The user uses a button to accept the character.

Step 608: The system optionally returns to normal directional text entry mode.

In addition to the preceding methods, the system may determine the precise letters by detecting the difference in speed of selection or change in acceleration, especially when the system embodiment is based on a directional selection means employing a wheel.

In the preferred embodiment above, the directional input system 100 is deployed to a home video game console machine. However, this technology can also be deployed to many other products such as portable video game devices, phones with the appropriate input methods, wheelchairs, and TV related electronic devices, etc. In TV related electronic devices, for example, the invention may be deployed as set-top boxes and the joystick/rocker may be incorporated in the remote controls.

Figure 7:
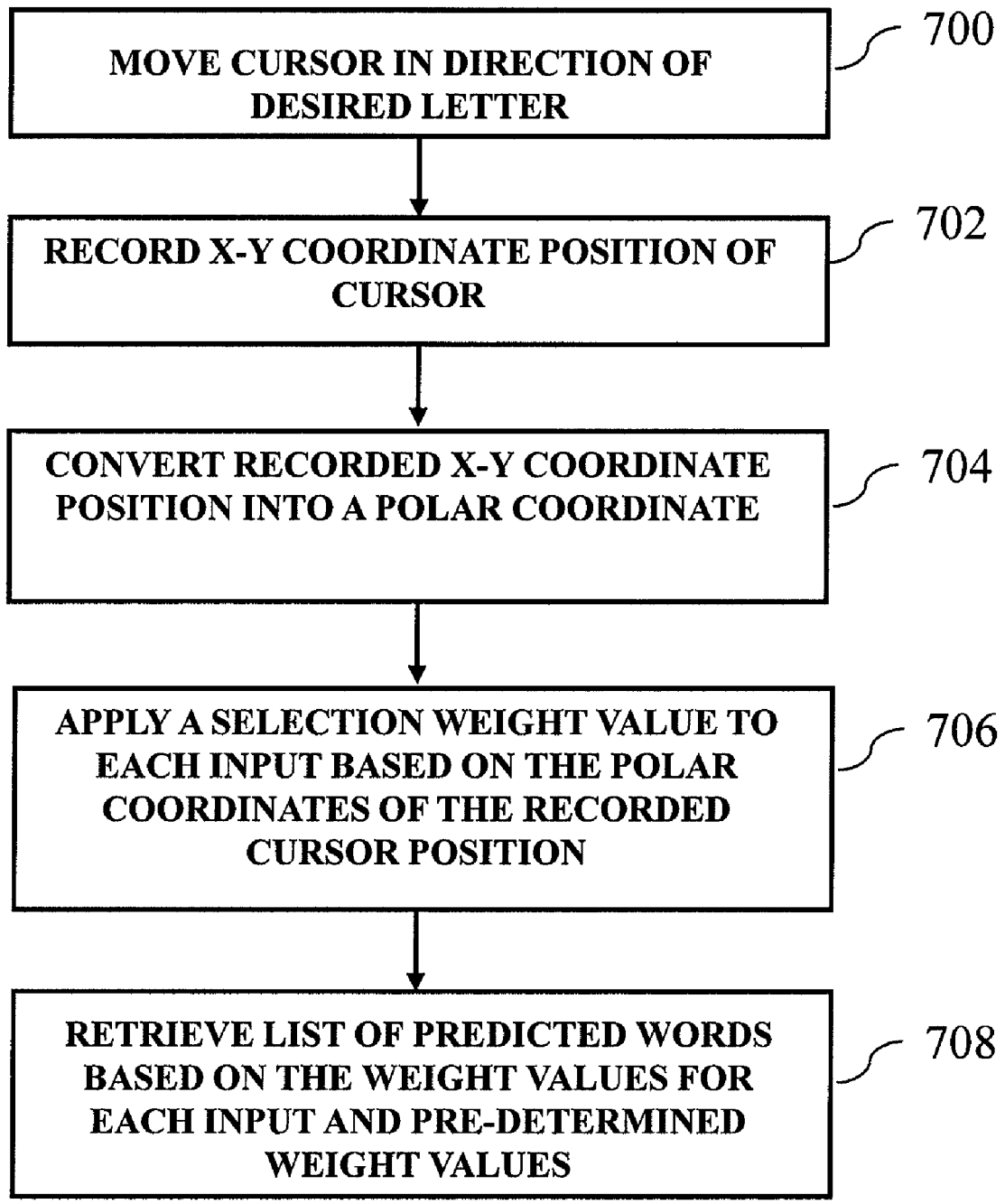
FIG. 7 is a flow diagram illustrating a process for operating the directional input system according to the invention.

FIG. 7 is a flow diagram illustrating a direction input method according to another preferred embodiment of the invention. The method includes the following steps:

Step 700: The user moves an on-screen cursor in the direction of the desired letter using a joystick, or any other directional input means.

Step 702: The system records the X-Y coordinate position of the cursor.

Step 704: The system converts recorded X-Y coordinate position into corresponding set of polar coordinates.

Step 706: The system applies a selection weight value to each input based on the set of polar coordinates of the recorded cursor position.

Step 708: The system retrieves a list of predicted words based on the weight values for each of input and a set of pre-determined values.

For internal calculations, the on-screen keyboard 130 may be represented internally in the same way as the screen using direct mapping. Alternatively, it can be represented in a very different format using virtual mapping. The internal representation of keyboards may use any coordinate system, including but not limited to Polar and Cartesian coordinate systems.

When the on-screen keyboard 130 is represented internally using a Polar system, key positions are set by bounding angles and radial distance from the center. In the preferred embodiment, multiple concentric circles are permitted. The system can accept direct Polar inputs. Alternatively, it can map Cartesian inputs into Polar coordinates before performing calculations.

When the on-screen keyboard 130 is represented internally using a Cartesian system, key positions are set by left, right, top, and bottom of a bounding box. The horizontal and vertical positions are relative to one corner, usually top left but can vary by platform and operating system (OS). In the preferred embodiment, multiple rows of keys are permitted.

The directional input system 100 may also alternate between several keyboards for a variety of reasons. Such reasons may include the following: uppercase vs. lowercase letters, alphabets for other supported languages, extended alphabets for languages with large numbers of letters, diacritics, numbers vs. letters, symbols and punctuation, strokes vs. character components, different alphabets for the same language, function keys, and precision mode for selecting specific exact spell characters.

In another preferred embodiment of the invention, the directional input system 100 also provides a mechanism for changing the keyboard face and the input directions. The system includes an input means to switch among a set of system modes. A mode is a combination of keyboard, keymap, and sometimes dictionary. Modes can be used for many things, including but not limited to entering characters, executing functions, and changing system parameters.

In the preferred embodiment, the system may also contain the following buttons: Space or Select word, Backspace, Next & Previous word, Next & Previous character, Shift/Caps Lock, and Menu/Mode switch. Each of these buttons is mapped to a system function. The functions that can be performed by buttons include, but are not limited to the following:

Select: Adding a specified word to the message area and at the same time clearing out the current word;

Next/Previous word: Altering which word is highlighted for selection;

Next/Previous character. Altering the last character entered;

Backspace/Delete word: Deleting a character or word;

Shift, Caps lock: Altering the case of letters being entered;

Undo: Undoing last function or entry;

Cut/Copy/Paste: Standard clipboard commands;

Escape: Activate/deactivate the directional text input;

Toggling Next Lock/Hold;

Extend or Add Suffix: Selecting a word and displaying its possible suffixes or using any additional characters entered to extend the selected root word;

Change to a new Language;

Change to a new Keyboard layout;

Download/install new language/keyboard layout/program version; and

Toggle Precision mode for Exact Spell.

Some characters that can optionally be entered by buttons include, but are not limited to:

"Smart Punctuation", which intuitively determines which punctuation is most appropriate based on the word context;

"Smart Diacritics", which intuitively determines which diacritic to be added; and "Smart Tones", which intuitively determines which tone to be added to a word for tonal languages, such as Vietnamese. Alternately, a tone key could display a selection of tones to add to the current word or last character entered.

The directional input system 100 supports multiple languages. Each language supported is stored in a separate language database (LDB). The language database stores words organized by word length and frequency of use within the given language. When the system uses case sensitive letters, the database storage is also case sensitive and thus words are stored in a mixed case format.

The directional input system 100 can optionally support user added words. These words are either stored in a separate user database (UDB) or appended to the primary language database (LDB). When a UDB is used, it organizes words by word length and recency of use.

The directional input system 100 can optionally support dynamic word prediction, where likelihood changes are made either by re-ordering sections of the LDB, or via a recency database (RDB) which is organized by word length and recency of use.

The final word choice list is retrieved and ordered using the following types of data: word length, ordinal ranking, letter weight, and recently used words. Only words that have at least as many letters as the letters entered are presented. When "Word Completion" is used, longer words may be presented if they are determined to be likely. Words in the LDB may be ordered by frequency, most common first, and least common last.

The invention adopts an algorithm which matches the entry sequence to letters of words in the LDB based on their nearness to the point/angle of each entry. For example, the weighting may approximate an inverse square of the distance from the center of the corresponding letter. Grouping letters for efficiency is an optional, yet preferred feature; it excludes letter matching when the letter is far outside of the smaller area of adjacent letters surrounding the point/angle of entry. A detailed description of the algorithm is set further in the copending application, U.S. Ser. No. 09/580,319, filed on May 26, 2000, entitled "KEYBOARD SYSTEM WITH AUTOMATIC CORRECTION". This detailed description is hereby incorporated by reference.

Each letter in a keyboard group has a relative weight to nearby letters. When one letter is entered, nearby letters are taken into account, and all of these letters are assigned a likelihood weight. The actual letter entered has the highest weight, and the weight decreases with distance from the exact letter. These letter weights combine to alter the order of likely words presented in the word choice list.

Recently used words may be weighted as more frequent, so their likelihood is increased and they are shown higher in the word choice list. Recency information is also used for determining the placement of user-defined words in the word choice list.

The directional input system 100 also supports word completion. If the system suspects that the letters entered are the beginning part of a longer word, longer words that roughly match are presented in the word choice list. Alternatively, the system can present the user a list of suffixes for a stem word. If a root word is selected with a "suffix button", a list of suffixes is then displayed at the end of the root, allowing the user to select the suffix of choice.

The directional input system 100 also allows the user to select a partial word while still building a word. The list is then filtered to only include words that begin with the chosen word stem. If a user scrolls down to an alternate word, and then adds more letters, this alternate word continues to be the selection, highlighted by the method discussed above, until it becomes invalid by further addition of characters.

Although the invention is described herein with reference to the preferred embodiment, one skilled in the art will readily appreciate that other applications may be substituted for those set forth herein without departing from the spirit and scope of the present invention.

Accordingly, the invention should only be limited by the Claims included below.

The invention claimed is:

1. A system for facilitating operations for text entry, the system comprising:
    a directional input tool having a mapping between different actual radial directions and different text characters, said directional input tool configured to use for sequentially pointing in an intended radial direction toward intended characters of at least part of an intended word;
    a determining processor configured for determining angular similarity between each actual pointing direction and radial directions of different characters in the mapping, for using the determined angular similarity to compute different possible combinations of intended characters that could form the intended word, and for presenting a list of potential matching words, where the presentation favors potential matching words according to factors including an aggregate angular similarity of constituent characters of a potential matching word to the actual pointing directions;
    a selecting processor for selecting the intended word from the list; and
    a displaying processor for displaying the selected word in a human-readable message composition display area.

2. A computer-implemented method for facilitating operations for text entry, the method comprising:
    by using a directional input tool having a mapping between different actual radial directions and different text characters, sequentially pointing in an intended radial direction toward intended characters of at least part of an intended word;
    determining, by a determining processor, angular similarity between each actual pointing direction and radial directions of different characters in the mapping, using the determined angular similarity to compute different possible combinations of intended characters that could form the intended word, and presenting a list of potential matching words, where the presentation favors potential matching words according to factors including an aggregate angular similarity of constituent characters of a potential matching word to the actual pointing directions;
    selecting, by a selecting processor, the intended word from the list; and
    displaying, by a displaying processor, the selected word in a human-readable message composition display area.

3. A computer-readable storage medium storing instructions which, when executed by one or more processors, cause the one or more processors to carry out the steps of:
    by using a directional input tool having a mapping between different actual radial directions and different text characters, sequentially pointing in an intended radial direction toward intended characters of at least part of an intended word;
    determining angular similarity between each actual pointing direction and radial directions of different characters in the mapping, using the determined angular similarity to compute different possible combinations of intended characters that could form the intended word, and pre senting a list of potential matching words, where the presentation favors potential matching words according to factors including an aggregate angular similarity of constituent characters of a potential matching word to the actual pointing directions;

selecting the intended word from the list; and displaying the selected word in a human-readable message composition display area.

* * * * *